United States Patent [19]

Williams

[11] Patent Number: 5,028,164
[45] Date of Patent: Jul. 2, 1991

[54] SCAFFOLD CONNECTION

[76] Inventor: Joe W. Williams, 16325 Varnado Rd., Walker, La. 70785

[21] Appl. No.: 581,738

[22] Filed: Sep. 13, 1990

[51] Int. Cl.$^5$ .............................................. B25G 3/00
[52] U.S. Cl. .................................. 403/246; 182/179; 403/49; 403/174
[58] Field of Search ................. 403/49, 175, 174, 246; 182/179, 178; 211/192

[56] References Cited

FOREIGN PATENT DOCUMENTS 2352194 12/1977 France ................................... 403/49
7801928 8/1979 Netherlands .......................... 403/49

Primary Examiner—Andrew V. Kundrat
Attorney, Agent, or Firm—Robert C. Tucker; William David Kiesel

[57] ABSTRACT

An improved scaffold connection is provided, comprising a first ring member having an upper side and a lower side, fixedly attachable to a vertical scaffold member; a connector body having a first end, a second end, a top, a bottom and sides, fixedly attachable at its second end to one end of a horizontal scaffold member having an upper surface, the connector body including a portion for attachment of the connector body to the upper side of the first ring member, the portion extending from the first end of the connector body; a cavity, extending through the body and opening exterior of the body at a first opening in the first end; and a latch member, positioned in the cavity and having a first end extending through the first opening, the latch member being pivotal within the cavity such that the first end is positionable below the lower side of the first ring member.

14 Claims, 5 Drawing Sheets

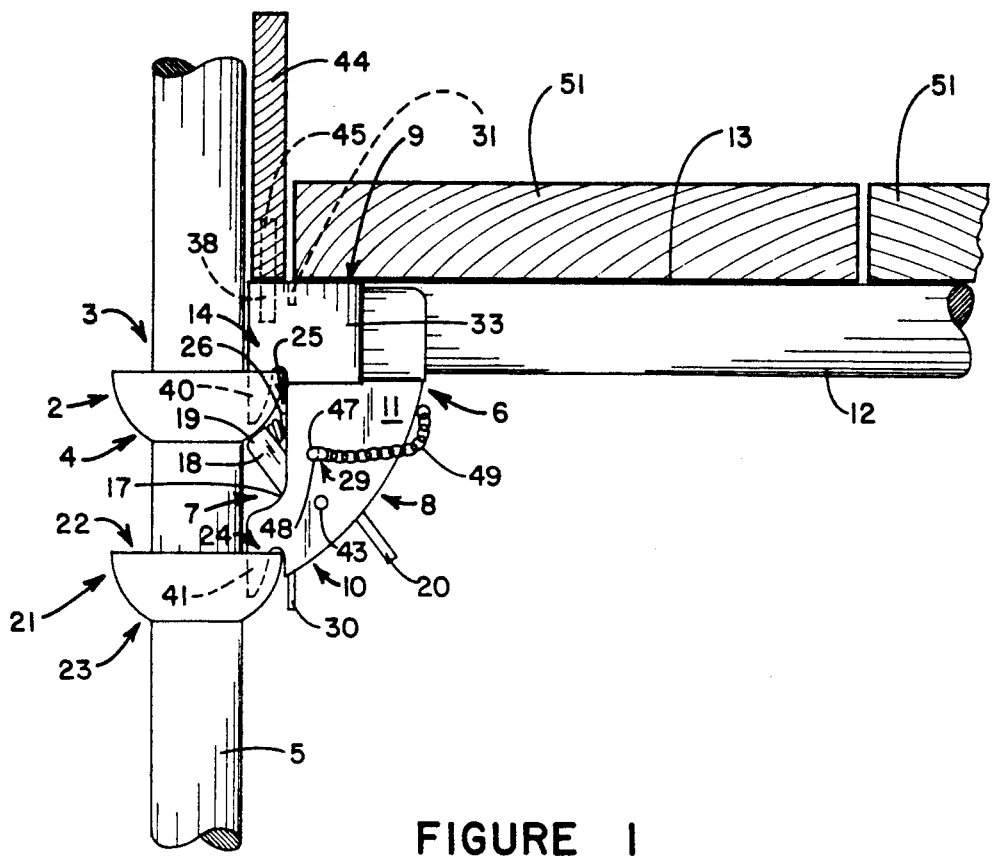
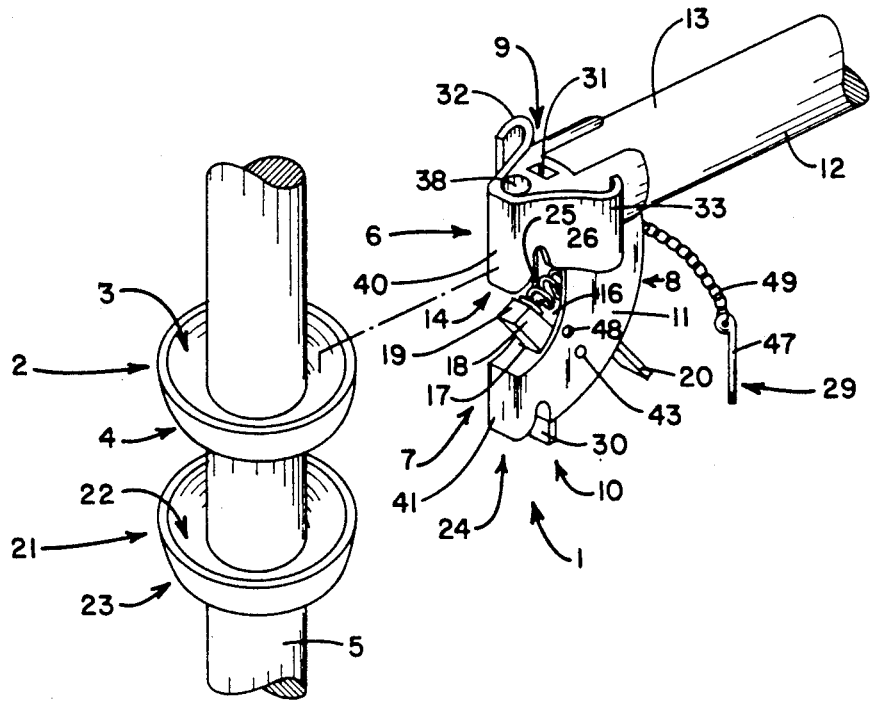
FIGURE 1
FIGURE 2

SCAFFOLD CONNECTION

BACKGROUND OF THE INVENTION

1. Field of the Invention

This invention relates generally to connections for scaffolding and, more particularly, to scaffolding connections between horizontal and vertical scaffold members.

2. Prior Art

Many different designs have been employed to secure the ends of horizontal scaffold members to vertical scaffold members. Because of a concern for a positive locking arrangement, most recent prior art connections employ a wedge assembly, whereby the connection between a horizontal and a vertical member is held in place by some type of wedge, which is usually driven into place. In order to remove a connection, the wedge must be driven out. Of course, tools are necessary to install or dismantle such connections. Further, since wedges must be driven into place, there is a possibility that all wedges are not driven into place in a particular scaffold installation, creating a potentially dangerous situation. Examples of such assemblies can be seen in U.S. Pat. Nos. 4,445,307 and 4,273,463.

Thus, one major concern with prior art connections is the ease of installing and dismantling scaffold members. Also, most prior art connections do not allow scaffold boards to be placed immediately adjacent to vertical scaffold members due to upwardly protruding parts of the connection assembly. This situation results in undesirable uncovered spaces in scaffold installations. Further, the construction of prior art connections makes the stacking of unassembled scaffold members difficult.

SUMMARY OF THE INVENTION

Therefore, it is an object of this invention to provide an improved scaffold connection which can be quickly and efficiently installed or dismantled without the aid of tools.

It is another object of this invention to provide an improved scaffold connection which enables scaffold planks to be placed directly adjacent to a vertical scaffold member.

It is yet another object of this invention to provide an improved scaffold connection which facilitates stacking of disassembled scaffold members.

It is another object of this invention to provide an improved scaffold connection which automatically locks into position without the necessity of driving a wedge into place.

It is a further object of this invention to provide an improved scaffold connection which accomplishes some or all of the above objects and positively and safely locks a horizontal and a vertical scaffold member together until removal is desirable.

Accordingly, an improved scaffold connection is provided, comprising a first ring member having an upper side and a lower side, fixedly attachable to a vertical scaffold member; a connector body having a first end, a second end, a top, a bottom and sides, fixedly attachable at its second end to one end of a horizontal scaffold member having an upper surface, the connector body including a portion for attachment of the connector body to the upper side of the first ring member, the portion extending from the first end of the connector body; a cavity, extending through the body and opening exterior of the body at a first opening in the first end; and a latch member, positioned in the cavity and having a first end extending through the first opening, the latch member being pivotal within the cavity such that the first end is positionable below the lower side of the first ring member.

BRIEF DESCRIPTION OF THE DRAWINGS

FIG. 1 is a side view of one embodiment of the invention.

FIG. 2 is a disassembled perspective view of the embodiment of the invention shown in FIG. 1.

DETAILED DESCRIPTION OF PREFERRED EMBODIMENTS OF THE INVENTION

Figure 3:
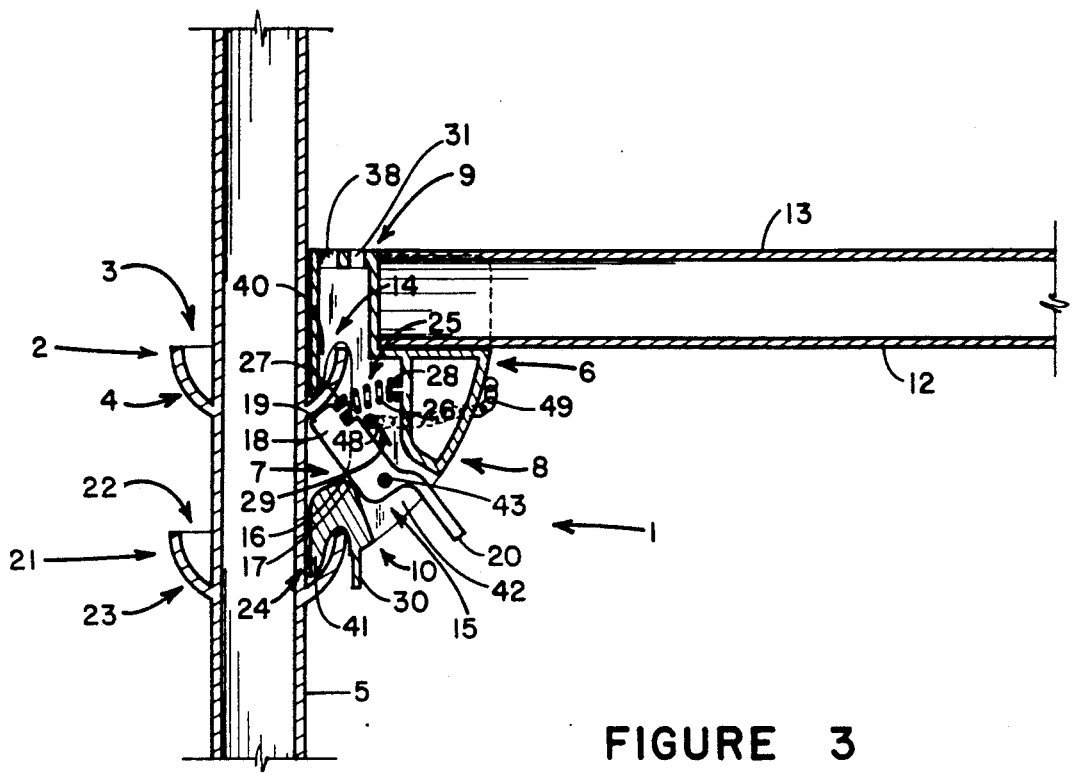
FIG. 3 is a sectional view of the embodiment shown in FIG. 1.

The Figures depict various embodiments of the improved scaffold connection 1, all of which incorporate the unique operational characteristics of the invention. As shown in FIGS. 1 and 2 the connection 1 includes a first ring member 2, which is fixedly attached to a vertical scaffold member 5, preferably by welding. First ring member 2 has an upper side 3 and a lower side 4. While not required, additional redundancy and stability can be obtained by the addition of second ring member 21 having upper side 22 and lower side 23, spaced below and attached similar to first ring member 2. A connector body 6 is fixedly attached to horizontal scaffold member 12, also preferably by welding. Connector body 6 has a first end 7, a second end 8, a top 9, a bottom 10 and sides 11. A means 14 for attachment of connector body 6 to upper side 3 of first ring member 2 extends from first end 7 of body 6. Preferably, means 14 should take the form of first hook portion 40, which matingly hooks onto upper side 3 of first ring member 2. If second ring member 21 is utilized, another means 24 is provided for attachment of connector body 6 to upper side 22 of second ring member 21. Preferably, means 25 should take the form of second hook portion 41, which matingly hooks onto upper side 22 of second ring member 21.

A cavity 15 is provided within body 6, extending exterior of first end 7 of body 6 through first opening 16. A support surface 17 may form the base of first opening 16 or may extend within cavity 15 below latch member 18. A latch member 18 is positioned within cavity 15, and is provided with a first end 19 extending through first opening 16. Latch member 18 is pivotal within cavity 15 so as to bear against support surface 17 when first end 19 is positioned below lower side 4 of first ring member 2, locking horizontal scaffold member 12 in place as shown in FIG. 1. Although first end 19 could bear against vertical scaffold member 5 when installed, it is preferable that support surface 17 support latch member 18 as shown in order to prevent undue loading of latch pin 43.

In the embodiment shown in FIGS. 1-3, cavity 15 also opens exterior of second end 8 of body 6 through second opening 42. Latch member 18 is pivotally held in place by latch pin 43. A resilient means 25 for urging latch member 18 through first opening 16 is provided. Preferably resilient means 25 comprises a spring 26, contained by spring studs 27 and 28, biasing latch member 18 against support surface 17. Thus, in order to install the connection 1 shown in FIGS. 1-3, second end 20 of latch member 18 is simply depressed, compressing spring 26 while connector body 6 is hooked into place. Then, latch member 18 is released allowing first end 19 to fall into position below lower side 4 of first ring member, automatically locking the connection 1 into place. As stated previously, support surface 17 may be as small as a lower edge of first opening 16, but is preferably of a greater area in order to provide increased support for latch member 18 against uplift of horizontal scaffold member 12. It is also preferable that first end 19 of latch member 18 be substantially heavier than second end 20, such that the weight of first end will naturally keep latch member 18 in the locked position shown in the Figures, should spring 26 fail. For further safety, a means 29 is provided for retaining latch member 18 in position below lower side 4 of first ring member 2. Means 29 can take various forms known in the art, including retainer pin 47, which fits into retainer pin hole 48 on connector body 6 and extends through cavity 15 preventing undesirable movement of latch member 18. Retainer pin 47 is supported by chain 49 when not in use.

Figure 4:
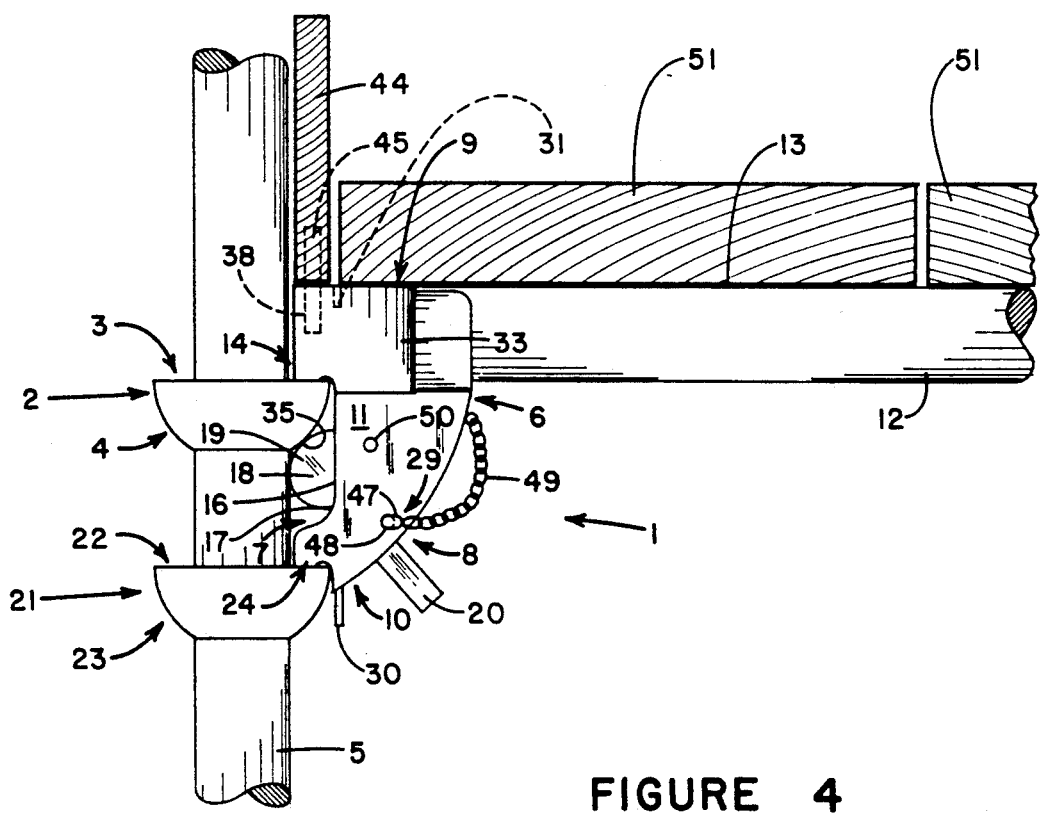
FIG. 4 is a side view of one embodiment of the invention.
Figure 5:
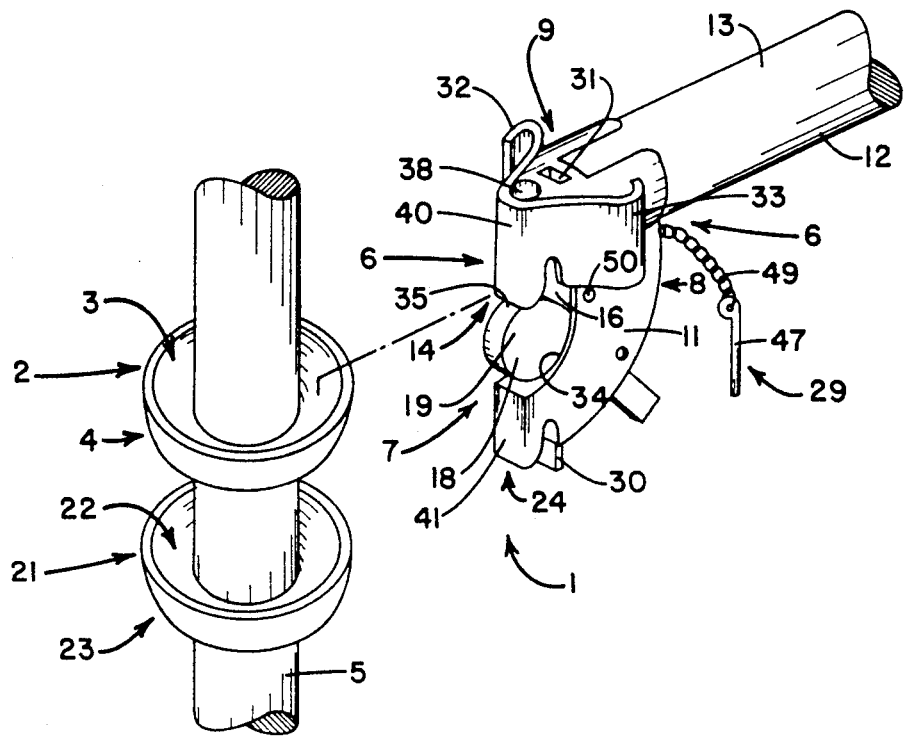
FIG. 5 is a disassembled perspective view of the embodiment of the invention shown in FIG. 3.
Figure 6:
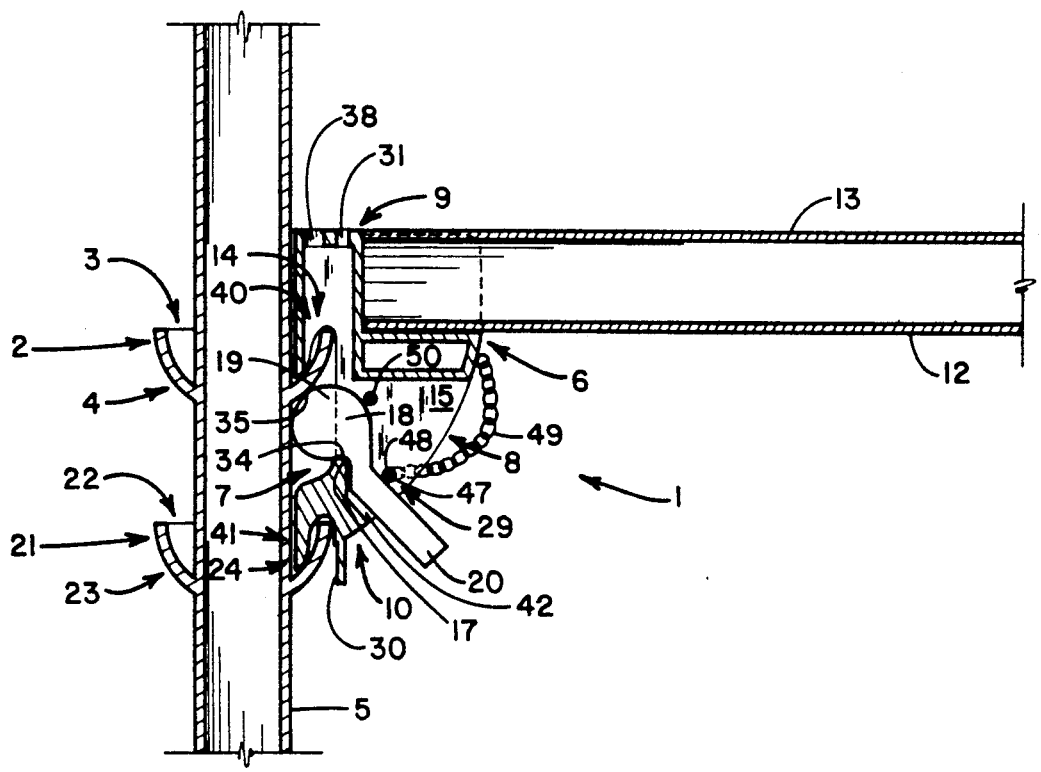
FIG. 6 is a sectional view of the embodiment shown in FIG. 3.
Figure 7:
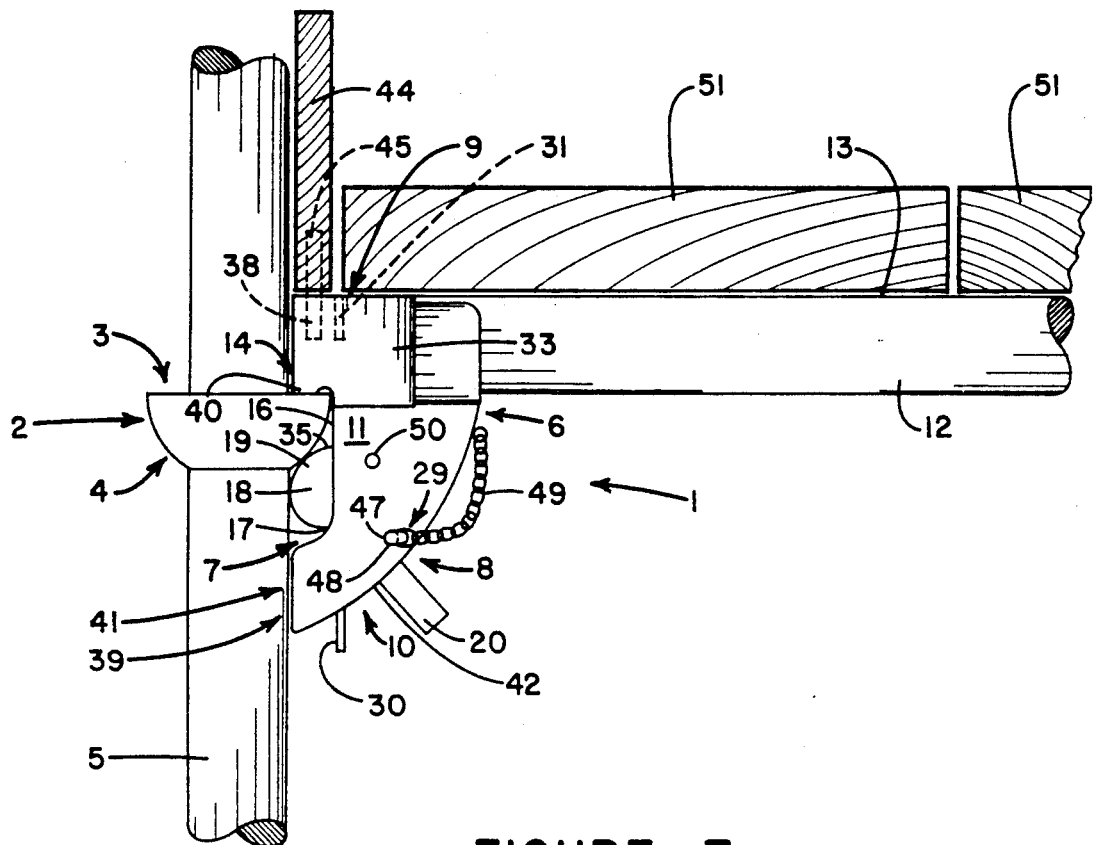
FIG. 7 is a side view of an alternate embodiment of the invention.

FIGS. 4-7 depict an alternate embodiment of the invention. Latch member 18 is provided with a base section 34 and first end 19 is provided with a cam surface 35. Base section 34 is preferably curved and bears against and rockingly pivots on support surface 17. In order to lock the connection 1 into position (as shown in FIG. 4), second end 20 of latch member 18 is simply urged downward, pivoting latch member 18 and forcing cam surface 35 into contact with lower side 4 of first ring member 2. Retainer pin 47 is placed in hole 48 to maintain the connection. Additionally, a cavity pin 50, running through body 6, is provided to help contain latch member 18, preventing it from falling through cavity 15. Unlocking the connection 1 is accomplished by reversing the process. FIG. 5 shows the connection 1 in unlocked position. FIG. 7 illustrates an embodiment of the invention 1 without second ring member 21 or means 24. An abutment means 39 is provided to support the lower portions of connector body 6 against vertical scaffold member 5.

Figure 8:
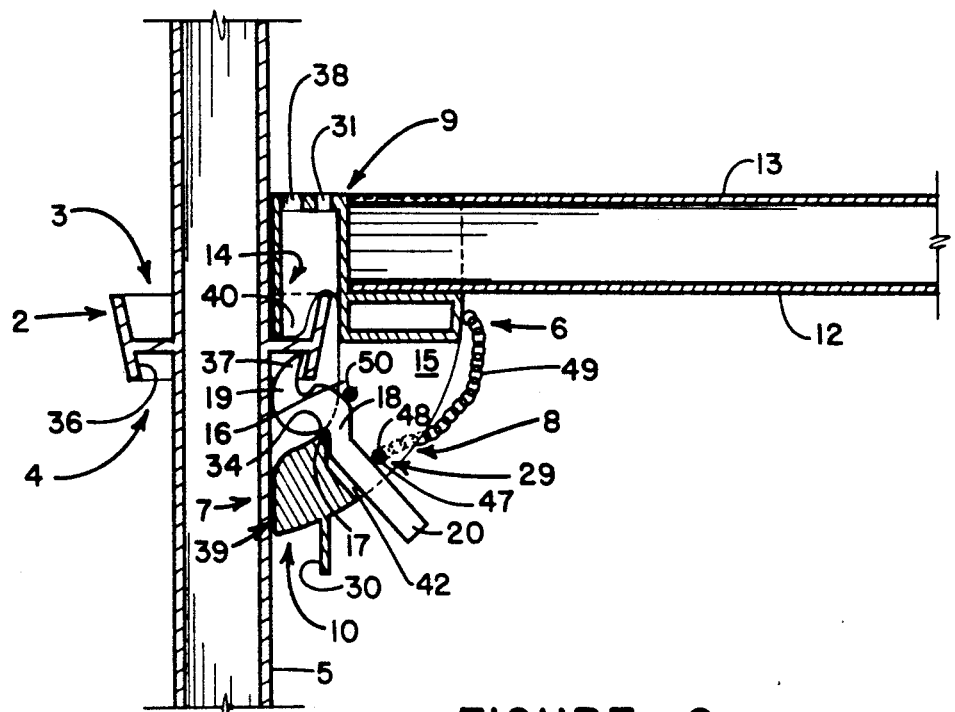
FIG. 8 is a sectional view of an alternate embodiment of the invention.

A slightly different version of the embodiments shown in FIGS. 4-7 is shown in FIG. 8. In this embodiment, first end 19 of latch member 18 is provided with a hook section 37, which hooks into contact with an annular flange 36 on lower side 4 of first ring member 2, latching the connection 1 together when second end 20 of latch member 18 is depressed.

Figure 9:
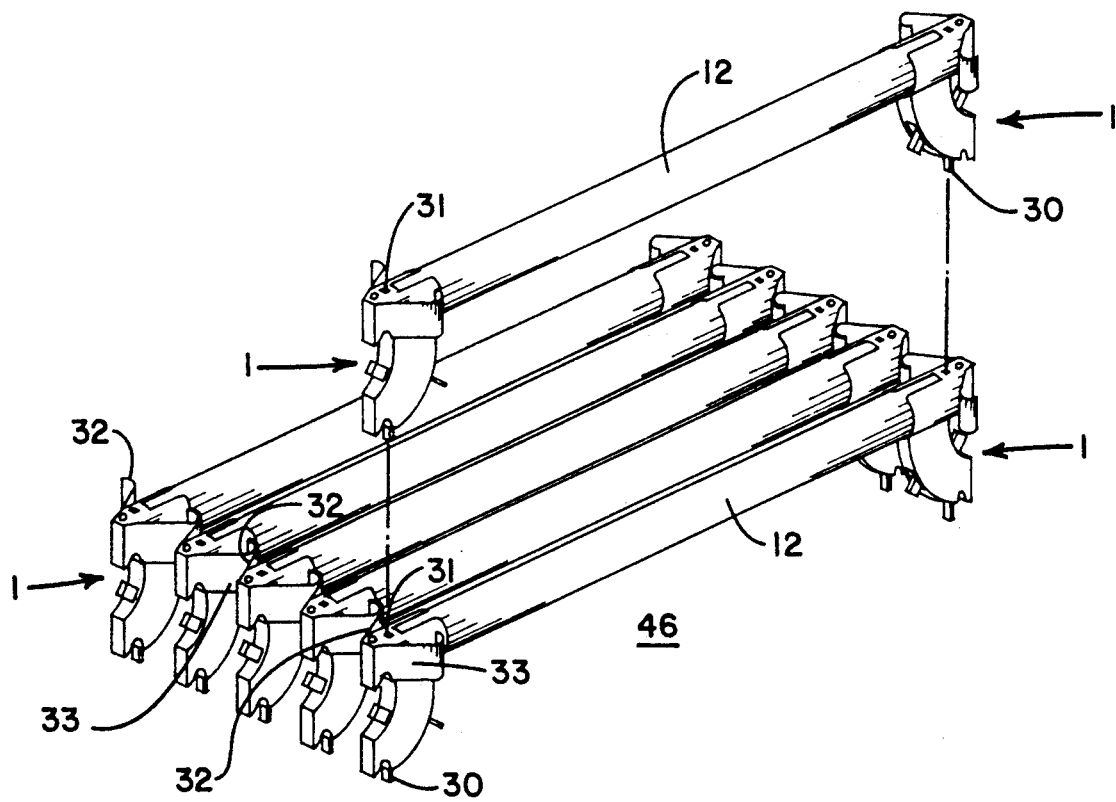
FIG. 9 is a perspective view of several horizontal scaffold members in a stacked arrangement utilizing the invention.

The design of all embodiments of the invention 1 allows for scaffold planks 51 to be placed directly on top 9 of connector body 6, which is level with upper surface 13 of horizontal scaffold member 12, and adjacent to vertical scaffold member 5 if desirable. Also, toe board support socket 38 allows for optional placement of toe boards 44 adjacent to vertical scaffold member 5 using toe board lugs 45 as shown in the Figures. The streamlined design of the invention 1 also facilitates stacking of horizontal scaffold members 12 as shown in FIG. 9. Stacking lugs 30, extending from the bottoms 10 of connector bodies 6, are positionable in lug alignment sockets 31 in the tops 9 of connector bodies 6. Further, each connector body 6 is provided with a stabilizer flange 32 and a retainer flange 33, extending from opposite sides 11 of body 6. The retainer flange 33 is adapted to receive the adjacent stabilizer flange 32 of an adjacent connector body 6 when horizontal scaffold members 12 are stacked as shown in FIG. 9. Thus, stacking lugs 30, sockets 31 and flanges 32 and 33 provide an extremely stable way to stack and move groups of horizontal scaffold members 12. The forks of a forklift are easily insertable through space 46 beneath scaffold members 12, allowing a large quantity of members 12 to be stacked and moved quickly and safely.

As can be seen, an improved scaffold connection is provided which securely locks a horizontal scaffold member to a vertical scaffold member, eliminating the need for driven wedges to provide such a connection. The improved connection is versatile in its application, and allows more efficient use of scaffold members. Other embodiments of the invention will occur to those skilled in the art, and are intended to be included within the scope and spirit of the following claims.

I claim:

1. An improved scaffold connection, comprising:
   a. A first ring member having an upper side and a lower side, fixedly attachable to a vertical scaffold member;
   b. a connector body having a first end, a second end, a top, a bottom and sides, fixedly attachable at said second end to one end of a horizontal scaffold member having an upper surface, said connector body including:
      i. a means for attachment of said connectors body to said upper side of said first ring member, extending from said first end of said connector body;
      ii. a cavity, extending through said body and opening exterior of said body at a first opening in said first end;
   c. a latch member, positioned in said cavity and having a first end extending through said first opening, said latch member being pivotal within said cavity such that said first end is positionable below said lower side of said first ring member; and
   wherein said connector body further includes a support surface positioned beneath said latch member, and wherein said latch member bears against said support surface when said first end is positioned below said lower side of said first ring member.

2. An improved scaffold connection according to claim 1, further comprising:
   c. a second ring member having an upper side and a lower side, fixedly attachable to said vertical scaffold member at a point spaced below said first ring member; and
   wherein said connector body further includes:
      iv. a means for attachment of said connector body to said upper side of said second ring member, extending from said first end of said connector body.

3. An improved scaffold connection according to claim 1, further comprising:

c. a resilient means for urging said latch member through said first opening, operably attached to said connector body and said latch member.

4. An improved scaffold connection according to claim 1, wherein said cavity opens to a second opening in said second end of said connector body and said latch means includes a second end extending through said second opening.

5. An improved scaffold connection according to claim 1, wherein said cavity opens to a second opening in said second end of said connector body and said latch means includes a second end extending through said second opening.

6. An improved scaffold connection according to claim 1, further comprising:
   c. a means for retaining said latch member in position below said lower side of said first ring member, attached to said connector body.

7. An improved scaffold connection according to claim 1, wherein said connector body further includes:
   iv. a stacking lug, protruding from said bottom of said connector body; and
   v. a lug alignment socket having the same shape as said lug, positioned in said top of said connector body.

8. An improved scaffold connection according to claim 7, wherein said connector body further includes:
   vi. a stabilizer flange extending from one said side of said connector body; and
   vii. a retainer flange, adapted to receive an adjacent said stabilizer flange, extending from the opposite side of said connector body from said stabilizer flange.

9. An improved scaffold connection according to claim 5, wherein said latch member is provided with a curved base section abutting said support surface of said connector body and said first end of said latch member is provided with a cam surface which is selectively engageable with said lower side of said first ring member.

10. An improved scaffold connection according to claim 5, wherein said lower side of said first ring member is provided with a downwardly protruding annular flange, and wherein said first end of said latch member is provided with a hook section which is engageable with said annular flange of said first ring member.

11. An improved scaffold connection according to claim 1, wherein said connector body is attachable to said horizontal scaffold member at a point on said connector body such that said top of said connector body is level with said upper surface of said horizontal scaffold member.

12. An improved scaffold connection according to claim 1, wherein said connector body is provided with a toe board support socket in said top.

13. An improved scaffold connection according to claim 1, wherein said connector body is provided with an abutment means for supporting said connector body against said vertical scaffold member, extending from said first end of said connector body below said latch means.

14. An improved scaffold connection, comprising:
   a. a first ring member having an upper side and a lower side, fixedly attachable to a vertical scaffold member;
   b. a connector body having a first end, a second end, a top, a bottom and sides, fixedly attachable at said second end to one end of a horizontal scaffold member having an upper surface, said connector body including:
      i. a means for attachment of said connector body to said upper side of said first ring member, extending from said first end of said connector body; and
      ii. a cavity, extending through said body and opening exterior of said body at a first opening in said first end; and
   c. a latch member, positioned in said cavity and having a first end extending through said first opening, said latch member being pivotal within said cavity such that said first end is positionable below said lower side of said first ring member; and
wherein said first end of said latch member is adapted so as to bear against said vertical scaffold member when said first end is positioned below said lower side of said first ring member.

* * * * *